Nov. 28, 1961  H. A. KLASENS ET AL  3,010,909
RED LUMINESCENT MATERIALS FOR COLOR TELEVISION PICTURE TUBES
Filed Dec. 10, 1958
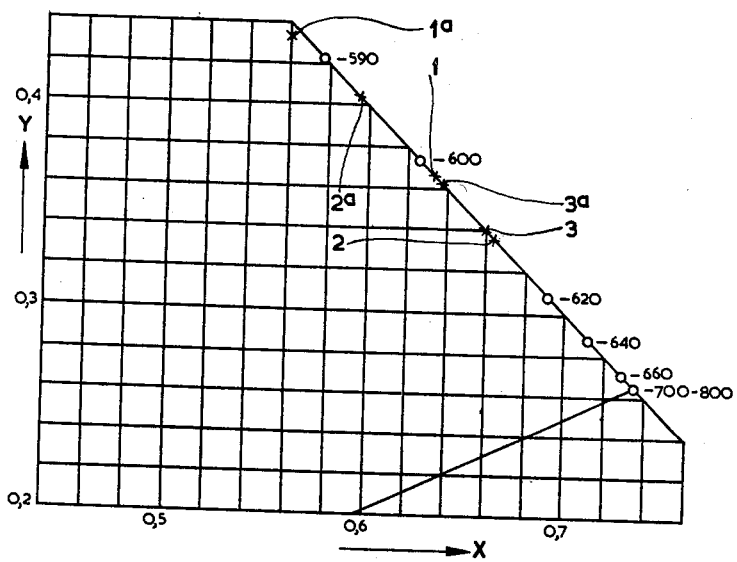
INVENTORS
HENDRIK ANNE KLASENS
WILLEM VAN GOOL
ALFRED BRIL
BY
AGENT

United States Patent Office 3,010,909
Patented Nov. 28, 1961

3,010,909
RED LUMINESCENT MATERIALS FOR COLOR TELEVISION PICTURE TUBES
Hendrik Anne Klasens, Willem van Gool, and Alfred Bril, all of Eindhoven, Netherlands, assignors to North American Philips Company Inc., New York, N.Y., a corporation of Delaware
Filed Dec. 10, 1958, Ser. No. 779,402
Claims priority, application Netherlands Dec. 18, 1957
3 Claims. (Cl. 252—301.6)

The present invention relates to cathode-ray tubes for color-reproduction, in particular of television pictures, and to luminescent screens for use in such cathode-ray tubes.

Cathode-ray tubes of the aforesaid type require the use of phosphors emitting light in several colors under electron-impact. For reproducing television pictures in natural colors usually three phosphors are used, which emit blue, green and red respectively. For the colors blue and green sulphides of zinc with various activators are well-nigh exclusively used, since these sulphides translate the energy of impinging electrons into light to a high degree of efficiency. For the red component manganese-activated zinc phosphate has mostly been employed. However, the lumen-efficiency of this zinc phosphate is comparatively low. Therefore, it has been contemplated to use a sulphide also for the red component. Practically the sole substance entering into account is zinc cadmium sulphide with silver as an activator. If, in this zinc cadmium sulphide, the ratio of the number of zinc atoms relative to the number of atoms of zinc and cadmium is chosen to be 0.05 to 0.35, while the quantity of silver is such that the number of silver atoms divided by the sum of the number of atoms of zinc and cadmium is between $10^{-3}$ and $10^{-6}$ and the material is, as is customary, prepared with a halide as a flux red light with a maximum at approximately 650 m$\mu$ is obtained upon electron-excitation.

However, the use of these red-luminescing sulphides of zinc and cadmium involves a serious disadvantage. As a matter of fact, the aforesaid value of the maximum emission holds for a comparatively low intensity of the electron current exciting the phosphor. With an increase of intensity of this current the color of the emitted light turns from red through orange to yellow. Of course, this color change is extremely harmful in color-reproduction.

It is to be noted that in the "Enlarged Abstracts" of the "Electro Chemical Society" for the "Spring Meeting, May 1 to 5, 1955," page 78, Vanja Svepel refers to said shift and concludes that silver-activated red-luminescing zinc cadmium sulphides are unsuitable for use in viewing screens for color-television tubes on account of said color shifts.

The present invention concerns cathode-ray tubes of the aforesaid type, in which as a red-luminescing component use is made of zinc cadmium sulphide involving the aforesaid disadvantages to a lower degree.

According to the invention, a cathode-ray tube for color-reproduction, in particular television pictures, comprises a viewing screen containing, as a luminous red component, zinc-cadmium-sulphide activated with silver and one or more of the trivalent elements gallium, scandium, aluminum, indium, cerium and yttrium, in which the number of zinc atoms divided by the sum of the number of atoms of zinc and cadmium is between 0.05 and 0.35, the number of silver atoms divided by the sum of the number of atoms of zinc and cadmium is between $10^{-3}$ and $10^{-6}$ and the sum of the number of atoms of the trivalent elements divided by the sum of the number of atoms of zinc and cadmium is between $10^{-3}$ and $10^{-6}$, the invention being characterized in that the sum of the number of atoms of the trivalent elements exceeds the number of silver atoms.

The sum of the number of atoms of the trivalent elements preferably exceeds by at least 10% the number of silver atoms.

The sum of the number of atoms of the trivalent elements divided by the sum of the number of atoms of zinc and cadmium is preferably at most $10^{-3}$.

Researches having led to the present invention revealed that instead of using halogen, for example chlorine, as a co-activator the aforesaid trivalent elements may be employed which fact is not novel per se. If, however, the aforesaid requirement that the sum of the number of atoms of trivalent elements should exceed the number of silver atoms is not fulfilled, then the color-shift, ascertained with halogen co-activated sulphides, likewise occurs with increasing intensity of the electron-impact. Surprisingly, it has however been found that this color-shift is much lower when fulfilling said requirement, which will be explained later with reference to the accompanying drawing.

In order to gain some knowledge regarding this color-shift it has been attempted to make the chlorine content larger than the silver content also in chlorine-co-activated sulphides. However, neither improvement no decrease of the color-shift was found. This is probably due to the fact that a major part of the chlorine escapes in the form of zinc chloride and/or cadmium chloride so that the chlorine content in the ultimate material is difficult to fix to a definite value exceeding the silver content. Moreover, the use of a large quantity of chlorine is disadvantageous, since it is very difficult to build the chlorine homogeneously into the luminescent materials, and there is a risk of chlorine, set free later in the cathode-ray tube, attacking the electrodes of the tube.

In order that the invention may be readily carried into effect an example is given for producing silver-activated zinc-cadmium-sulphide with gallium as a co-activator.

*Example*

100 gms. of (ZnCd)S, ratio Zn:Cd=1:4 are wetted and thoroughly mixed with 100 ml. of an AgNO$_3$ solution containing $10^{-3}$ g. atom of Ag per lit. and with 120 ml. of a solution of Ga(NO$_3$)$_3$, containing $10^{-3}$ g. atom of Ga per lit. After evaporating to dryness the dry material is heated for one hour at 1000° C. in a H$_2$S-atmosphere.

For producing compounds with the other co-activators a solution of the nitrate of the elements scandium, aluminum, indium, cerium or yttrium may be substituted for the solution of gallium nitrate. Instead of using the nitrates it is alternatively possible to use other soluble compounds, for example sulphates, both for gallium and for said elements.

In order to illustrate the effect of the choice of the ratio between activator and co-activator in the sulphides for use in cathode-ray tubes according to the invention, the drawing shows a color-triangle according to the I.C.I.-standard ("Transactions of the Optical Society," 33, 74, 1931–1932), indicating the color-points of two series of different zinc-cadmium-sulphides. One series consists of the points 1, 2 and 3 measured at an electron-impact intensity of 3 $\mu$a. per sq. cm. on the luminescent screen. The second series made up of points 1a, 2a and 3a was measured at an intensity of 35 $\mu$a. per sq. cm. The points 1 and 1a were measured on a material composition (0.20 Zn.0.80 Cd)S:$10^{-4}$ Ag, $x$Cl and the points 2 and 2a on a material having a composition (0.20 Zn.0.80 Cd)S:$10^{-4}$ Ag, 8.$10^{-5}$ Ga. The points 3 and 3a apply to a material of a composition (0.20 Zn.0.80 Cd)S:$10^{-4}$ Ag, 12.$10^{-5}$ Ga, which substance may consequently be used in cathode-ray tubes according to the invention.

As may be seen, the points 3 and 3a are much closer together than the points 2, 2a and 1 and 1a. When increasing the intensity of from 3 μa. per sq. cm. to 35 μa. per sq. cm. the material with the color-points 3, 3a consequently continues to emit red light, whereas the other materials tend to emit orange and even yellow light.

Measurements on materials containing the other trivalent co-activators yielded the same light shift as illustrated with gallium co-activated zinc-sulphide.

What is claimed is:

1. A red luminescent material particularly adapted for use in the picture tubes of color television receivers and consisting essentially of a zinc cadmium sulfide luminescent material activated with a mixture of silver and at least one trivalent elemnet selected from the group consisting of gallium, scandium, aluminum, indium, cerium and yttrium in which the quotient of the number of zinc atoms divided by the sum of the number of atoms of zinc and cadmium is between about 0.05 and 0.35, the quotient of the number of silver atoms divided by the sum of the number of atoms of zinc and cadmium is between about $10^{-3}$ and $10^{-6}$ the quotient of the sum of the number of the atoms of the trivalent elements divided by the sum of the number of atoms of zinc and cadmium is between about $10^{-3}$ and $10^{-6}$ and the sum of the number of the atoms of the trivalent elements exceeds the number of the silver atoms.

2. The luminescent material of claim 1 in which the quotient of the sum of the number of atoms of the trivalent elements divided by the sum of the number of atoms of zinc and cadmium does not exceed $10^{-3}$.

3. The luminescent material of claim 2 in which the sum of the number of the atoms of the trivalent elements exceeds the number of silver atoms by at least 10%.

References Cited in the file of this patent

UNITED STATES PATENTS

| | | |
|---|---|---|
| 2,623,857 | Kroger | Dec. 30, 1952 |
| 2,623,858 | Kroger | Dec. 30, 1952 |
| 2,623,859 | Kroger | Dec. 30, 1952 |